(12) United States Patent
Amano et al.

(10) Patent No.: US 8,651,965 B2
(45) Date of Patent: Feb. 18, 2014

(54) VIBRATION DAMPING DEVICE

(75) Inventors: Hiroyuki Amano, Susono (JP); Yu Miyahara, Susono (JP); Shinichiro Suenaga, Susono (JP); Shingo Aijima, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/499,573

(22) PCT Filed: Nov. 3, 2011

(86) PCT No.: PCT/JP2011/055758
§ 371 (c)(1),
(2), (4) Date: Mar. 30, 2012

(87) PCT Pub. No.: WO2012/124014
PCT Pub. Date: Sep. 20, 2012

(65) Prior Publication Data
US 2013/0116054 A1    May 9, 2013

(51) Int. Cl.
*F16D 7/02*    (2006.01)
(52) U.S. Cl.
USPC ............................................ 464/46; 464/68.2
(58) Field of Classification Search
USPC ........ 464/46, 68.2; 192/55.1, 55.2, 56.1, 201; 74/574.2
See application file for complete search history.

(56) References Cited

U.S. PATENT DOCUMENTS

| 2,743,805 A | * | 5/1956 | Lindberg et al. | |
|---|---|---|---|---|
| 6,280,330 B1 | * | 8/2001 | Eckel et al. | 464/68.2 X |
| 6,358,153 B1 | | 3/2002 | Carlson et al. | |
| 2010/0242466 A1 | | 9/2010 | Krause et al. | |
| 2011/0177906 A1 | | 7/2011 | Misu et al. | |

FOREIGN PATENT DOCUMENTS

| JP | 2000 283235 | 10/2000 |
|---|---|---|
| JP | 2002 013547 | 1/2002 |
| JP | 2003 525398 | 8/2003 |
| JP | 2010 216523 | 9/2010 |
| JP | 2011 504987 | 2/2011 |

OTHER PUBLICATIONS

International Search Report issued on Jun. 7, 2011 in PCT/JP11/055758 filed on Nov. 3, 2011.

* cited by examiner

*Primary Examiner* — Gregory Binda
(74) *Attorney, Agent, or Firm* — Oblon, Spivak, McClelland, Maier & Neustadt, L.L.P.

(57) ABSTRACT

A vibration damping device capable of reducing a change in an order frequency of a reciprocating motion of a pendulum resulting from eccentricity of rotational members therein. The vibration damping device comprises a pendulum damping mechanism having a mass to dampen the torsional vibrations by an oscillating motion thereof resulting from the torsional vibrations. An inertial body is arranged in the prime mover side of the rotary shaft, an elastic damping mechanism is connected with a transmission side of the inertial body in a power transmittable manner, a pendulum damping mechanism is connected with the transmission side of the elastic damping mechanism in a power transmittable manner, and a torque limiter mechanism is connected with the transmission side of the pendulum damping mechanism in a power transmittable manner.

2 Claims, 1 Drawing Sheet

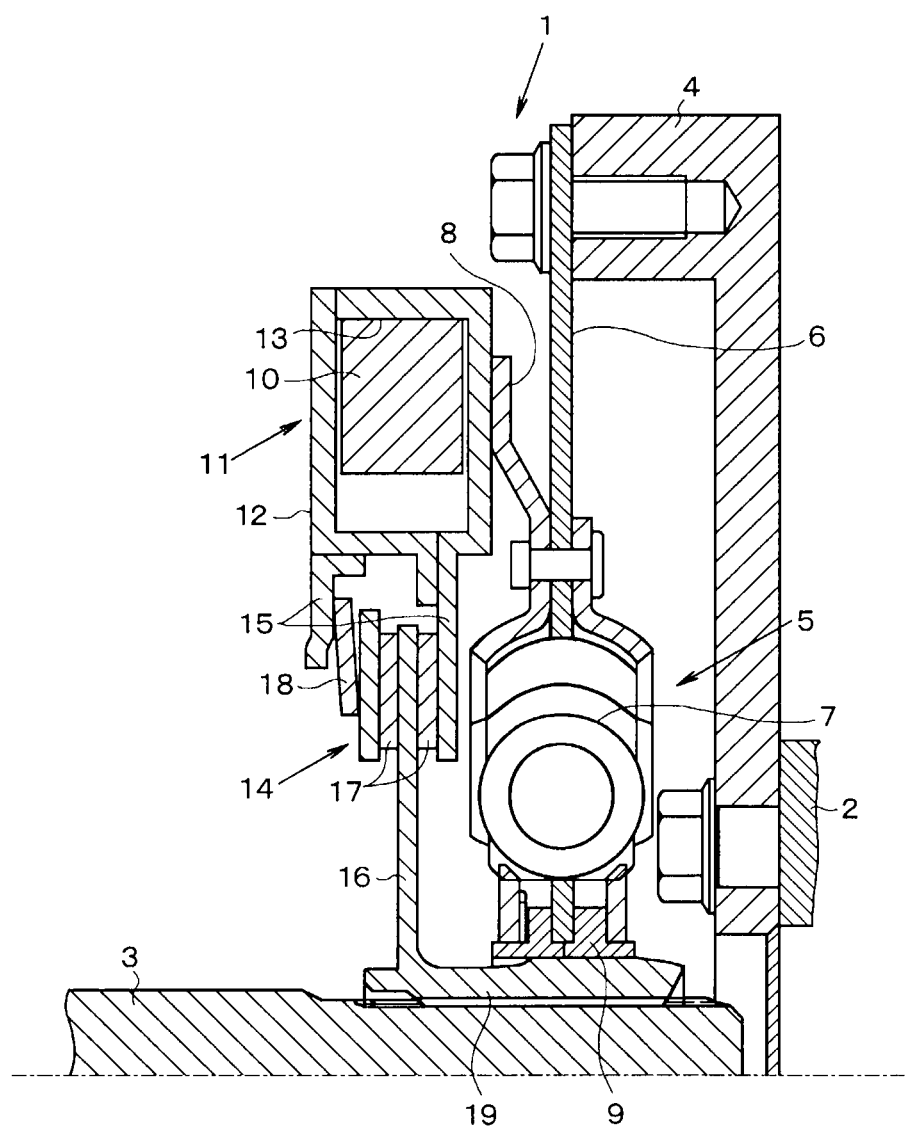

VIBRATION DAMPING DEVICE

TECHNICAL FIELD

The present invention relates to a vibration damping device, which is attached to a rotary member to reduce fluctuations of torque inputted to the rotary member, and to dampen torsional vibration resulting from the fluctuation of torque.

BACKGROUND ART

An example of a conventional vibration damping device configured to reduce torque fluctuations of a rotary member and to dampen torsional vibrations of the rotary member resulting from the torque fluctuations is disclosed in Japanese Patent Laid-Open No. 2002-13547. In order to reduce the torque fluctuations and to dampen the torsional vibrations, the vibration damping device taught by Japanese Patent Laid-Open No. 2002-13547 is attached to a crank shaft of an engine of a vehicle, an input shaft of a transmission, a drive shaft and so on.

The vibration damping device taught by Japanese Patent Laid-Open No. 2002-13547 is arranged on a rotary shaft between an engine and a transmission for changing a speed derived from a power generated by the engine. The rotary shaft on which the vibration damping device is thus arranged includes an output shaft of the engine and an input shaft of the transmission connected therewith in a power transmittable manner. The vibration damping device taught by Japanese Patent Laid-Open No. 2002-13547 is provided with: a first inertial body adapted to absorb the torque fluctuations and the torsional vibrations by an inertia force; a torque limiter mechanism connected with the first inertial body and arranged closer to the transmission than the first inertial body; and a torsion mechanism, which is connected with the torque limiter mechanism in a power transmittable manner and arranged closer to the transmission than the torque limiter mechanism, and which is configured to absorb or dampen the torque fluctuations and the torsional vibrations by the inertia force of an elastic member thereof. Specifically, the torsion mechanism is arranged inside of the torque limiter mechanism in a radial direction of the rotary shaft, and connected with a member rotated integrally with the rotary shaft which is provided with a second inertial body. The torque limiter mechanism is configured to limit a power transmission between the output shaft and the input shaft in case torque therebetween is increased to a certain extent.

Thus, the vibration damping device taught by Japanese Patent Laid-Open No. 2002-13547 is configured to reduce or dampen the torque fluctuation and the torsional vibrations of the rotary member by the inertia forces of the first and the second inertial bodies, and the elastic force of the elastic member of the torsion mechanism. In order to enhance the vibration damping ability, for example, it may be effective to substitute the second inertial body with a pendulum damper comprising a pendulum adapted to reduce the torque fluctuation and to dampen the torsional vibrations by an oscillating motion thereof resulting from the torque fluctuation and the torsional vibrations.

However, the torque limiter mechanism may structurally cause a misalignment between a rotational center of the output shaft arranged in the engine side (i.e., a drive side) of the torque limiter mechanism, and a rotational center of the input shaft arranged in the transmission side (i.e., a driven side) across the torque limiter mechanism. Therefore, if the vibration damping device taught by Japanese Patent Laid-Open No. 2002-13547 is modified to enhance the vibration damping ability as described above, a rotational center of the pendulum damper may be decentered with respect to the rotational center of the output shaft.

If the rotational center of the pendulum damper is decentered with respect to the rotational center of the output shaft, a distance between the rotational center of the output shaft and a fulcrum of oscillation of the pendulum is varied. Consequently, an order frequency of the oscillating motion of the pendulum is changed by such decentering of the rotational center of the pendulum damper. In this case, the vibration damping ability of the pendulum damper and the vibration damping device may be degraded.

Alternatively, it is also considerable to substitute the first inertial body of the vibration damping device taught by Japanese Patent Laid-Open No. 2002-13547 with the pendulum damper. However, if such modification is carried out, power of the engine is inputted directly to the pendulum damper. Therefore, durability and the damping ability of the pendulum damper may be degraded.

DISCLOSURE OF THE INVENTION

The present invention has been conceived noting the technical problems thus far described, and an object of the present invention is to provide a vibration damping device, which is capable of reducing a change in an order frequency of oscillating motion of a pendulum resulting from eccentricity of rotational centers of rotary members in the vibration damping device.

In order to achieve the above-mentioned object, according to the present invention, there is provided a vibration damping device, which has an inertial body which is configured to dampen torsional vibrations of a rotary shaft transmitting a power of a prime mover to a transmission by an inertia force, an elastic damping mechanism, which is configured to dampen the torsional vibrations by an elastic force of an elastic member thereof, and a torque limiter mechanism which is configured to limit a power transmission in case the power inputted to the rotary shaft exceeds a predetermined value. According to the present invention, the vibration damping device thus structured is characterized by comprising a pendulum damping mechanism having a mass adapted to dampen the torsional vibrations by an oscillating motion thereof resulting from the torsional vibrations. The inertial body is arranged in the prime mover side of the rotary shaft, and the elastic damping mechanism is connected with a transmission side of the inertial body in a power transmittable manner. The pendulum damping mechanism is connected with the transmission side of the elastic damping mechanism in a power transmittable manner, and the torque limiter mechanism is connected with the transmission side of the pendulum damping mechanism in a power transmittable manner.

Specifically, the pendulum damping mechanism is situated outside of the torque limiter mechanism in a radial direction of the rotary shaft, and the pendulum damping mechanism and the torque limiter mechanism are overlapped with each other in the radial direction of the rotary shaft.

According to the present invention, the rotary shaft includes an output shaft of the prime mover and an input shaft of the transmission connected with the output shaft in a power transmittable manner. The inertial body is connected with the output shaft in a manner to be rotated integrally therewith. The elastic damping mechanism comprises: an input side member, which is connected with the inertial body while being allowed to rotate relatively with the input shaft; and an output side member, which is configured to output the power whose torsional vibrations are damped by an elastic force of the elastic member while being allowed to rotate relatively with the input side member. The pendulum damping mechanism is connected with the output side member in a manner to rotate integrally therewith, and the torque limiter mechanism is fitted onto the input shaft in a manner to rotate integrally therewith.

According to the present invention, the aforementioned mass includes a rolling member configured to dampen the torsional vibrations by a rolling motion and an oscillating motion thereof resulting from the torsional vibrations, and a pendulum configured to dampen the torsional vibrations by a pendulum motion thereof resulting from the torsional vibrations.

Thus, according to the present invention, the inertial body is arranged in the prime mover side of the rotary shaft, the elastic damping mechanism is connected with a transmission side of the inertial body in a power transmittable manner, the pendulum damping mechanism is connected with the transmission side of the elastic damping mechanism in a power transmittable manner, and the torque limiter mechanism is connected with the transmission side of the pendulum damping mechanism in a power transmittable manner. According to the present invention, since the torque limiter mechanism is thus arranged closest to the transmission, a change in a balance of an inertial mass in the prime mover side from the torque limiter mechanism can be reduced. That is, imbalance can be reduced. Specifically, in case the imbalance is large, initial vibrations of the rotary shaft may be induced. However, such initial vibrations of the rotary shaft can be prevented by thus reducing the imbalance. In addition, since the pendulum damping mechanism is arranged in the prime mover side of the torque limiter mechanism, eccentricity of the rotational center of the pendulum damping mechanism with respect to the rotational center of the rotary shaft can be prevented. As a result, a change in an order frequency of oscillating motion of a pendulum can be reduced. In other words, the order frequency of oscillating motion of a pendulum will not be varied by a decentering of a rotational center of the rotary shaft of a driven side with respect to a rotational center of the rotary shaft of a drive side across the torque limiter mechanism (i.e., by an eccentricity of the rotational axis of the torque limiter mechanism). For this reason, the vibration damping ability can be stabilized. In addition, as described, the torque limiter mechanism is situated closest to the transmission. Therefore, in case the torque limiter mechanism limits the power transmission, the inertia torque acting on the transmission can be reduced. In addition, in case an excessive torque is inputted inversely to the prime mover from the transmission, a response of the torque limiter mechanism to limit the torque transmission can be improved. Therefore, durability of the pendulum damping mechanism can be ensured against the excessive torque imputed inversely.

As described, according to the present invention, the pendulum damping mechanism is situated outside of the torque limiter mechanism in the radial direction of the rotary shaft, and those mechanisms are overlapped in the radial direction of the rotary shaft. Therefore, in addition to the above-explained advantages, the vibration damping device can be downsized.

As also described, according to the present invention, the pendulum damping mechanism is configured to rotate integrally with the output shaft. Therefore, the order frequency of oscillating motion of the pendulum will not be varied by an eccentricity of the rotational center of the torque limiter mechanism under the situation in which the torque limiter mechanism limits the power transmission.

In addition, according to the present invention, the mass of the pendulum damping mechanism thus includes the rolling member configured to dampen the torsional vibrations by the rolling motion and the oscillating motion thereof resulting from the torsional vibrations, and the pendulum configured to dampen the torsional vibrations by the pendulum motion thereof resulting from the torsional vibrations. Specifically, the torsional vibrations of a vibration damping object can be absorbed or damped by approximating the order frequency of oscillating motion of the rolling member or the pendulum to the order frequency of the object.

BRIEF DESCRIPTION OF THE DRAWINGS

FIG. 1 is a view schematically showing the vibration damping device according to the present invention.

BEST MODE FOR CARRYING OUT THE INVENTION

Next the present invention will be explained in more detail. According to the present invention, the vibration damping device can be integrated with a rotary shaft or a rotary member to which a torque of a prime mover is inputted to be rotated. The vibration damping device comprises: an inertial body which is configured to absorb or dampen torsional vibrations of the rotary shaft or the rotary member by an inertia force thereof; an elastic damping mechanism, which is configured to absorb or dampen the torsional vibrations by an elastic force of an elastic member thereof; a pendulum damping mechanism having a mass adapted to absorb or dampen the torsional vibrations by an oscillating motion thereof resulting from the torsional vibrations; and a torque limiter mechanism which is configured to limit the power transmission in case the power inputted to the rotary shaft or the rotary member is larger than a predetermined value. According to the present invention, the pendulum damping mechanism is situated outside of the torque limiter mechanism in the radial direction of the rotary shaft, and those mechanisms are overlapped in the radial direction of the rotary shaft. According to the present invention, the vibration damping device thus structured is arranged on a rotary shaft situated between a prime mover and a transmission arranged in an output side of the prime mover. That is, the rotary shaft includes an output shaft of the prime mover and an input shaft of the transmission connected with the output shaft of the prime mover in a power transmittable manner.

According to the present invention, specifically, the torque limiter mechanism is fitted onto the input shaft of the transmission, and the other elements are arranged on the output shaft of the prime mover. That is, according to the present invention, the vibration damping mechanism is configured to prevent a change in a distance between the rotational center of the rotary shaft (i.e., the output shaft) and a fulcrum of oscillation of the mass, which determines an order frequency of the oscillating motion of the mass. Specifically, the vibration damping mechanism is configured to prevent a decentering of the rotational center of the pendulum damping mechanism with respect to a rotational center of the output shaft of the prime mover resulting from an eccentricity of the rotational center of the torque limiter mechanism. According to the vibration damping device thus structured, therefore, the order frequency of the oscillating motion of the mass can be prevented from being varied.

FIG. 1 is a view schematically showing the vibration damping device according to the present invention. As shown in FIG. 1, a vibration damping device 1 is arranged between an output shaft 2 of the (not shown) prime mover and an input shaft 3 of the (not shown) transmission, which is arranged in an output side of the prime mover in a power transmittable manner, and which is configured to transmit the power inputted thereto from the prime mover while changing a speed derived from the power. For example, an internal combustion engine such as a gasoline engine and a diesel engine, an electric motor, a hybrid type prime mover using both of the internal combustion engine and the electric motor may be used as the prime mover. The aforementioned output shaft 2 and the input shaft 3 correspond to the rotary shaft of the present invention.

A flywheel 4 is attached to the output shaft 2 of the prime mover in a manner to rotate integrally with the output shaft 2. Specifically, the flywheel 4 (also called a drive plate) is configured to dampen a torque fluctuation and torsional vibrations of the output shaft 2. For this purpose, the flywheel 4 has a mass appropriate to dampen the torque fluctuation and the torsional vibrations, and shaped into a circular plate. Thus, the flywheel 4 corresponds to the inertial body of the present invention.

An elastic damping mechanism 5 is arranged closer to the transmission than the flywheel 4 in an axial direction of the output shaft 2, and radially inside of the flywheel 4. Specifically, the elastic damping mechanism 5 is configured to absorb or dampen the torque fluctuation and the torsional vibrations by an elastic member thereof. For this purpose, the elastic damping mechanism 5 is provided with: an annular drive plate 6 functioning as an input rotary member; a damper spring 7 as a compressed coil spring; and a driven plate 8 functioning as an output rotary member. In addition, the drive plate 6 is connected with the flywheel 4 in a manner to rotate integrally therewith.

The drive plate 6 and the driven plate 8 are configured to be rotated relatively with each other, and the damper spring 7 is held therebetween. When the drive plate 6 and the driven plate 8 are rotated relatively, the damper spring 7 is compressed by the relative rotation between the drive plate 6 and the driven plate 8. As a result, the torsional vibrations between the drive plate 6 and the driven plate 8 are absorbed or damped by the elastic force of the damper spring 7. A bush 9 or a bearing is interposed between the elastic damping mechanism 5 and the input shaft 3. Therefore, the elastic damping mechanism 5, that is, the drive plate 6 and the driven plate 8 are allowed to slide on the input shaft 3 thereby rotating relatively with the input shaft 3. The bush 9 may be arranged on any of the elastic damping mechanism 5 and the input shaft 3. Thus, the bush 9 is interposed between the elastic damping mechanism 5 or the pair of the drive and the driven plates 6 and 8 and the input shaft 3 to allow those element to rotate slidably and relatively with each other. In addition, since the bush 9 is thus arranged, the input shaft 3 can be inserted into those elements easily when assembling the transmission.

A pendulum damping mechanism 11 comprises a mass 10 configured to dampen the torsional vibrations by an oscillating motion thereof resulting from the torsional vibrations. According to the example shown in FIG. 1, the pendulum damping mechanism 11 is arranged closer to the transmission than the elastic damping mechanism 5 in the axial direction of the output shaft 2, and outside of the elastic damping mechanism 5 in a radial direction of the flywheel 4. Alternatively, the pendulum damping mechanism 11 may also be arranged inside of the elastic damping mechanism 5 in the radial direction of the flywheel 4. More specifically, the pendulum damping mechanism 11 comprises: a mass 10 having a predetermined mass; a chamber 12 for holding the mass 10 therein; and a rolling face 13 which is formed on an inner wall of the chamber 12, and on which the mass 10 rolls when the torsional vibration is generated. In addition, the chamber 12 is attached to the driven plate 8 of the elastic damping mechanism 5 to be rotated integrally therewith.

The pendulum damping mechanism 11 thus structured is used to absorb or dampen the torque fluctuations or the torsional vibrations of the object to which the vibration damping device is attached, by a reciprocating motion of the mass 10. For this purpose, according to the example shown in FIG. 1, an order frequency of the reciprocating motion of the mass 10 is equalized or approximated to an order frequency of the torsional vibration of the output shaft 2, that is, to an order frequency of initial vibrations of the output shaft 2. In this example, a rolling member is used as the mass 10, and as described, the order frequency of the reciprocating motion of the mass 10 is approximated to the order frequency of the torsional vibration of the rotary shaft 2. Therefore, the torsional vibrations of the rotary shaft 2 is absorbed or dampened by the rolling motion of the mass 10 on the rolling face 13 resulting from the torsional vibrations. Alternatively, according to the present invention, a pendulum may also be used as the mass 10 instead of the rolling member. In this case, the torsional vibrations of the rotary shaft 2 is absorbed or dampened by an oscillating motion of the pendulum resulting from the torsional vibrations.

A torque limiter mechanism 14 is connected with an inner circumferential end of the pendulum damping mechanism 11 in a side closer to the transmission than the flywheel 4 in the axial direction of the output shaft 2. Specifically, the torque limiter mechanism 14 is configured to limit the power transmission in case the power inputted thereto exceeds a predetermined value. As shown in FIG. 1, the torque limiter mechanism 14 comprises: a drive plate 15, which is integrated with the pendulum damping mechanism 11; a driven plate 16, which is configured to be pushed toward the drive plate 15; a friction member 17, which is interposed between the plates 15 and 16; and an elastic member 18, which is adapted to push the driven plate 16 toward the drive plate 15 by an elastic force thereof.

That is, the torque limiter mechanism 14 is configured to transmit the torque by pushing the driven plate 16 onto the drive plate 15. However, in case the torque acting between the drive plate 15 and the driven plate 16 exceed a predetermined value, the drive plate 15 and the driven plate 16 start slipping with each other thereby limiting the transmission of the torque therebetween. In addition, a hub 19 is formed on an inner circumferential end of the driven plate 16, and the hub 19 is splined to the input shaft 3. Therefore, the driven plate 16 is rotated integrally with the input shaft 3 through the hub 19.

Thus, according to the vibration damping device shown in FIG. 1, the torque limiter mechanism 14 is configured to transmit the torque between the drive plate 15 and the driven plate 16 by engaging those plates 15 and 16 with each other. However, as described, the torque is limited to be transmitted in the torque limiter mechanism 14 by slipping the drive plate 15 on the driven plate 16 being pushed onto the drive plate 15 by the elastic force of the elastic member 18. In case the torque limiter mechanism 14 is thus limiting the torque transmission, that is, in case the drive plate 15 is thus slipping on the driven plate 16, the flywheel 4, the elastic damping mechanism 5 and the pendulum damping mechanism 11 are rotated integrally with the output shaft 2 of the prime mover but rotated relatively with the input shaft 3 of the transmission.

According to the example shown in FIG. 1, therefore, even in case the rotational center of the input shaft 3 situated in the transmission side from the torque limiter mechanism 14 is decentered with respect to the rotational center of the output shaft 2 situated in the prime mover side from the torque limiter mechanism 14, the rotational center of the pendulum damping mechanism 11 can be prevented from being decentered with respect to the rotational center of the output shaft 2. Therefore, a distance from the rotational center of the output shaft 2, that is, a distance from the rotational center of the pendulum damping mechanism 11 to a fulcrum of oscillation of the mass 10 which determines the order frequency of the reciprocating motion of the mass 10 will not be changed in this case. Consequently, the vibration damping ability can be stabilized. In addition to the above-explained advantage, according to the example shown in FIG. 1, the elastic damping mechanism 5 and the pendulum damping mechanism 11 are arranged in a drive side of the torque limiter mechanism 14. Therefore, even if the rotational center of the input shaft 3 is decentered with respect to the rotational center of the output shaft 3, the rotational centers of the elastic damping mechanism 5 and the pendulum damping mechanism 11 will not be decentered with respect to the rotational center of the output shaft 2. For this reason, in the vibration damping device 1, a balance of an inertial mass will not be changed by such eccentricity of the rotational centers. That is, imbalance in the vibration damping device 1 can be reduced. Since the imbalance in the vibration damping device 1 is thus reduced, the initial vibrations of the output shaft 2 can especially be reduced. As also described, according to the present invention, the torque limiter mechanism 14 is arranged closest to the transmission. Therefore, in case the torque limiter mechanism 14 is limiting the torque transmission, the inertia torque acting on the input shaft 3 can be reduced. In addition, in case an excessive torque is inputted inversely to the prime mover from the transmission, a response of the torque limiter mechanism 14 to limit the torque transmission can be improved. Therefore, strength of the elastic damping mechanism 5 and the pendulum damping mechanism 11 against the excessive torque inputted inversely can be ensured.

The invention claimed is:

1. A vibration damping device, comprising:
an inertial body, which is configured to dampen torsional vibrations of a rotary shaft transmitting a power of a prime mover to a transmission by an inertia force;
an elastic damping mechanism, which is configured to dampen the torsional vibrations by an elastic force of an elastic member thereof;
a torque limiter mechanism, which is configured to limit a power transmission in case the power inputted to the rotary shaft exceeds a predetermined value; and
a pendulum damping mechanism having a mass adapted to dampen the torsional vibrations by an oscillating motion thereof resulting from the torsional vibrations;
wherein the inertial body is arranged in the prime mover side of the rotary shaft,
wherein the elastic damping mechanism is connected with a transmission side of the inertial body in a power transmittable manner,
wherein the pendulum damping mechanism is connected with the transmission side of the elastic damping mechanism in a power transmittable manner,
wherein the torque limiter mechanism is connected with the transmission side of the pendulum damping mechanism in a power transmittable manner,
wherein the pendulum damping mechanism is situated outside of the torque limiter mechanism in a radial direction of the rotary shaft, and
wherein the pendulum damping mechanism and the torque limiter mechanism are overlapped with each other in the radial direction of the rotary shaft.

2. The vibration damping device as claimed in claim 1, wherein:
the rotary shaft includes an output shaft of the prime mover and an input shaft of the transmission connected with the output shaft in a power transmittable manner;
the inertial body is connected with the output shaft in a manner to be rotated integrally therewith;
the elastic damping mechanism comprises
an input side member, which is connected with the inertial body while being allowed to rotate relatively with the input shaft, and
an output side member, which is configured to output the power whose torsional vibrations are damped by an elastic force of the elastic member while being allowed to rotate relatively with the input side member;
the pendulum damping mechanism is connected with the output side member in a manner to rotate integrally therewith; and
the torque limiter mechanism is fitted onto the input shaft in a manner to rotate integrally therewith.

\* \* \* \* \*

UNITED STATES PATENT AND TRADEMARK OFFICE
CERTIFICATE OF CORRECTION

| | | |
|---|---|---|
| PATENT NO. | : 8,651,965 B2 | Page 1 of 1 |
| APPLICATION NO. | : 13/499573 | |
| DATED | : February 18, 2014 | |
| INVENTOR(S) | : Hiroyuki Amano et al. | |

It is certified that error appears in the above-identified patent and that said Letters Patent is hereby corrected as shown below:

On the title page, Item (22), the PCT Filing Date information is incorrect. Item (22) should read:

--(22) PCT Filed: Mar. 11, 2011--

Signed and Sealed this
Twenty-first Day of October, 2014

Michelle K. Lee
*Deputy Director of the United States Patent and Trademark Office*